US006771898B2

(12) United States Patent
Bean et al.

(10) Patent No.: US 6,771,898 B2
(45) Date of Patent: Aug. 3, 2004

(54) DIRECTION AND COLLIMATION CONTROLLABLE FLASH

(75) Inventors: Heather N Bean, Fort Collins, CO (US); Mark N. Robins, Greeley, CO (US)

(73) Assignee: Hewlett-Packard Company, Houston, TX (US)

( * ) Notice: Subject to any disclaimer, the term of this patent is extended or adjusted under 35 U.S.C. 154(b) by 0 days.

(21) Appl. No.: 10/108,129

(22) Filed: Mar. 26, 2002

(65) Prior Publication Data

US 2003/0185552 A1 Oct. 2, 2003

(51) Int. Cl.[7] .......................... G03B 15/02; G03B 15/06
(52) U.S. Cl. .......................... 396/62; 396/175; 396/200
(58) Field of Search .......................... 396/61, 62, 174, 396/175, 200; 362/7, 18, 17, 16

(56) References Cited

U.S. PATENT DOCUMENTS

| 3,783,261 | A | * | 1/1974 | Hartmann | 362/18 |
| 5,055,866 | A | * | 10/1991 | Takebayashi | 396/175 |
| 5,272,570 | A | * | 12/1993 | Yoshida et al. | 359/853 |
| 6,400,905 | B1 | * | 6/2002 | Tenmyo | 396/175 |

* cited by examiner

Primary Examiner—Russell Adams
Assistant Examiner—Arthur A Smith
(74) Attorney, Agent, or Firm—Leslie P. Gebman

(57) ABSTRACT

An electronic flash is constructed with the ability to vary both collimation and direction allowing a user to direct the flash to a portion of the subject. Collimation and direction of the flash may be displayed in the viewfinder of the camera and may be independently controlled by the user.

39 Claims, 4 Drawing Sheets

DIRECTION AND COLLIMATION CONTROLLABLE FLASH

FIELD OF THE INVENTION

The present invention relates generally to the field of photography and more specifically to the control of the direction and collimation of a camera flash.

BACKGROUND OF THE INVENTION

Since the development of the electronic flash many cameras have incorporated a small built-in flash into their design. While limited in power, these flashes often serve as a fill flash for backlit subjects or a primary light source for nearby subjects. Some cameras with zoom lenses also include means for controlling the collimation of a built-in flash. The flash collimation often is configured to be proportional to the present focal length of the zoom lens. As the focal length of the lens increases the collimation of the flash also increases to substantially match the angle of view of the lens.

Some current electronic flash units are configured to tilt and swivel the flash head or the entire unit. This allows the user to bounce the flash off of a ceiling or wall to create indirect, diffuse lighting instead of the often harsh lighting of a direct flash.

SUMMARY OF THE INVENTION

An electronic flash is constructed with the ability to vary both collimation and direction allowing a user to direct the flash to a portion of the subject. Collimation and direction of the flash may be displayed in the viewfinder of the camera and may be independently controlled by the user.

Other aspects and advantages of the present invention will become apparent from the following detailed description, taken in conjunction with the accompanying drawings, illustrating by way of example the principles of the invention.

DETAILED DESCRIPTION

Figure 1:
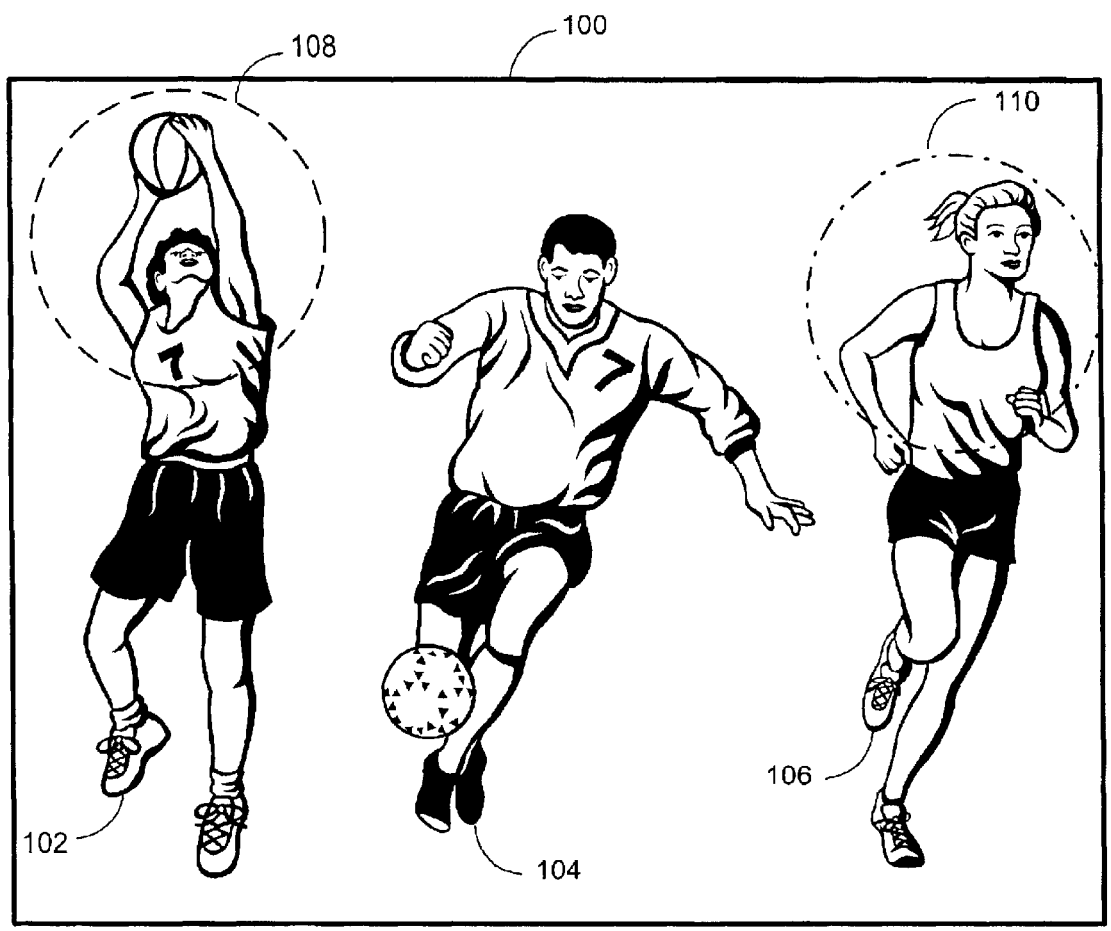
FIG. 1 is an illustration of an example scene demonstrating the use of a direction controllable flash for cameras with solid angle control according to the present invention.

FIG. 1 is an illustration of an example scene demonstrating the use of a direction controllable flash for cameras with solid angle control according to the present invention. FIG. 1 is representative of what a user may see in a viewfinder of a camera constructed according to the present invention. In the viewfinder window 100 are a boy playing basketball 102, a boy playing soccer 104, and a running girl 106. In the example embodiment of the present invention shown in FIG. 1, the user has decided to highlight the boy playing basketball 102 and a flash indication 108 showing the user both the collimation of the flash and the direction of the flash is displayed in the viewfinder window 100. This flash indication 108 shown in the example embodiment of the present invention is a dashed circle. Other embodiments of the present invention may use other flash indication 108 means of representing to the user the direction and collimation of the flash. For example, a square or rectangle, solid or dotted lines, highlighting may all be used as a flash indication 108 within the scope of the present invention. Some low-cost implementations of the present invention may forego the use of a flash indication 108 displayed within a viewfinder window 100 and merely allow the user to set the direction and collimation of the flash. Other embodiments of the present invention may display a flash indication 108 on a liquid crystal display (LCD) outside of the viewfinder window or use other methods of indicating the direction and collimation of the flash such as a quantity of light emitting diodes (LEDs).

In some embodiments of the present invention two or more highlight areas may be desired. For example, a user may want to highlight the running girl 106 in addition to the boy playing basketball 102, and a second flash indication 110 may be displayed within a viewfinder window 100 to set a highlight on the running girl 106.

In other embodiments of the present invention, the direction and collimation of the flash may be automatically controlled by a processor in the image capture device. For example, a digital camera may have several different portraiture modes built in and automatically select from them when taking a portrait.

Figure 2:
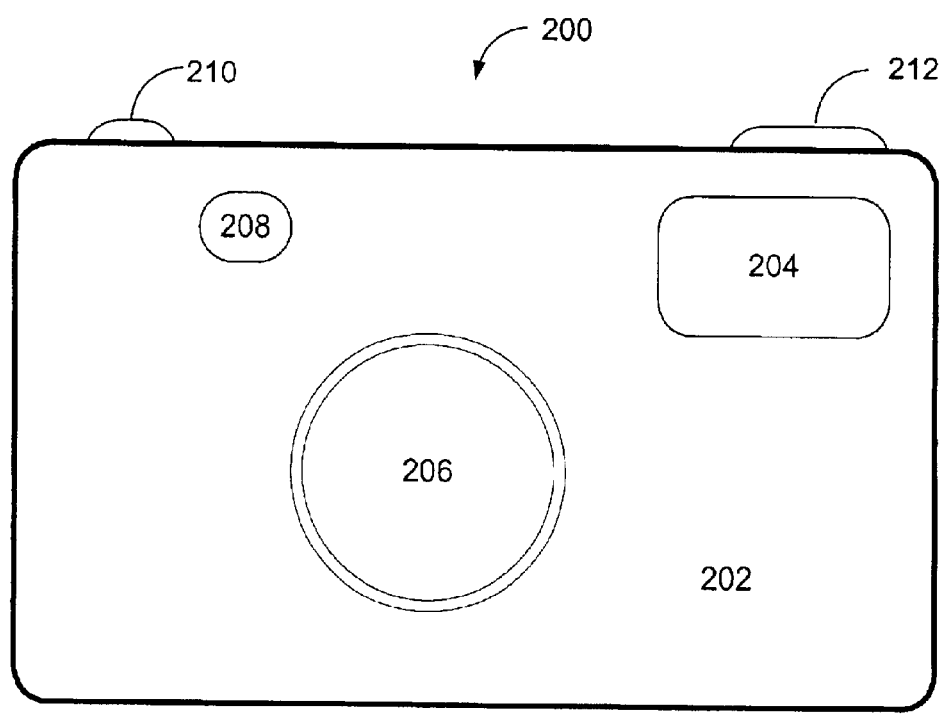
FIG. 2 is front view of an example embodiment of a camera including a direction controllable flash with solid angle control according to the present invention.

FIG. 2 is front view of an example embodiment of a camera including a direction controllable flash with solid angle control according to the present invention. An example embodiment of a camera 200 constructed according to the present invention may include a camera body 202, a lens 206, a direction and collimation controllable flash 204, an external viewfinder window 208, a shutter release 210, and a first control 212. In an example embodiment of the present invention, the first control 212 may be used to control the collimation of the flash 204. In other embodiments of the present invention, the first control 212 may be used to control the direction of the flash 204.

In other embodiments of the present invention, the direction and collimation controllable flash may be configured as a device separate from the camera. It may attach to the camera via a hot shoe, and additional signals within the hot shoe may control the direction and collimation of the flash. In some simple embodiments of the present invention the direction and collimation of the flash may be controlled mechanically by the user of the camera through rods pushing the flash or parts of the flash to change the direction the flash points and the collimation of the flash.

Figure 3:
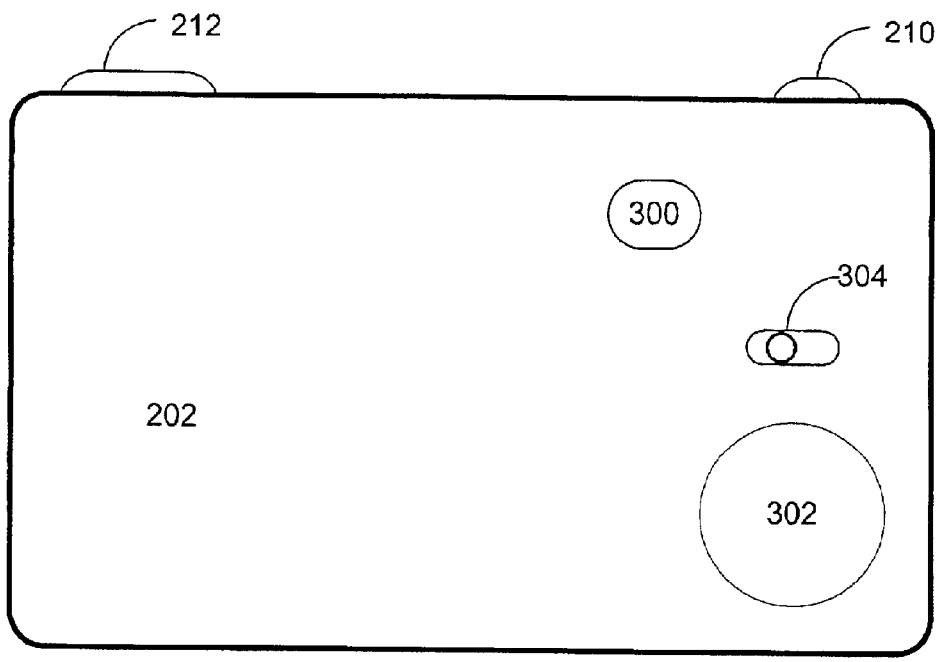
FIG. 3 is rear view of an example embodiment of a camera including a direction controllable flash with solid angle control according to the present invention.

FIG. 3 is rear view of an example embodiment of a camera including a direction controllable flash with solid angle control according to the present invention. The example embodiment of a camera 200 constructed according to the present invention may also include a viewfinder window 300, a switch 304, and a second control 302. In an example embodiment of the present invention, the switch 304 may activate the second control 302, and the second control 302 may be used to control the direction of the flash 204. In other embodiments of the present invention, the second control 302 may be used to control the collimation of the flash 204. In some embodiments of the present invention the direction of the flash 204 may be controlled by eye movements of the user as the user looks into the viewfinder window 300.

Figure 4:
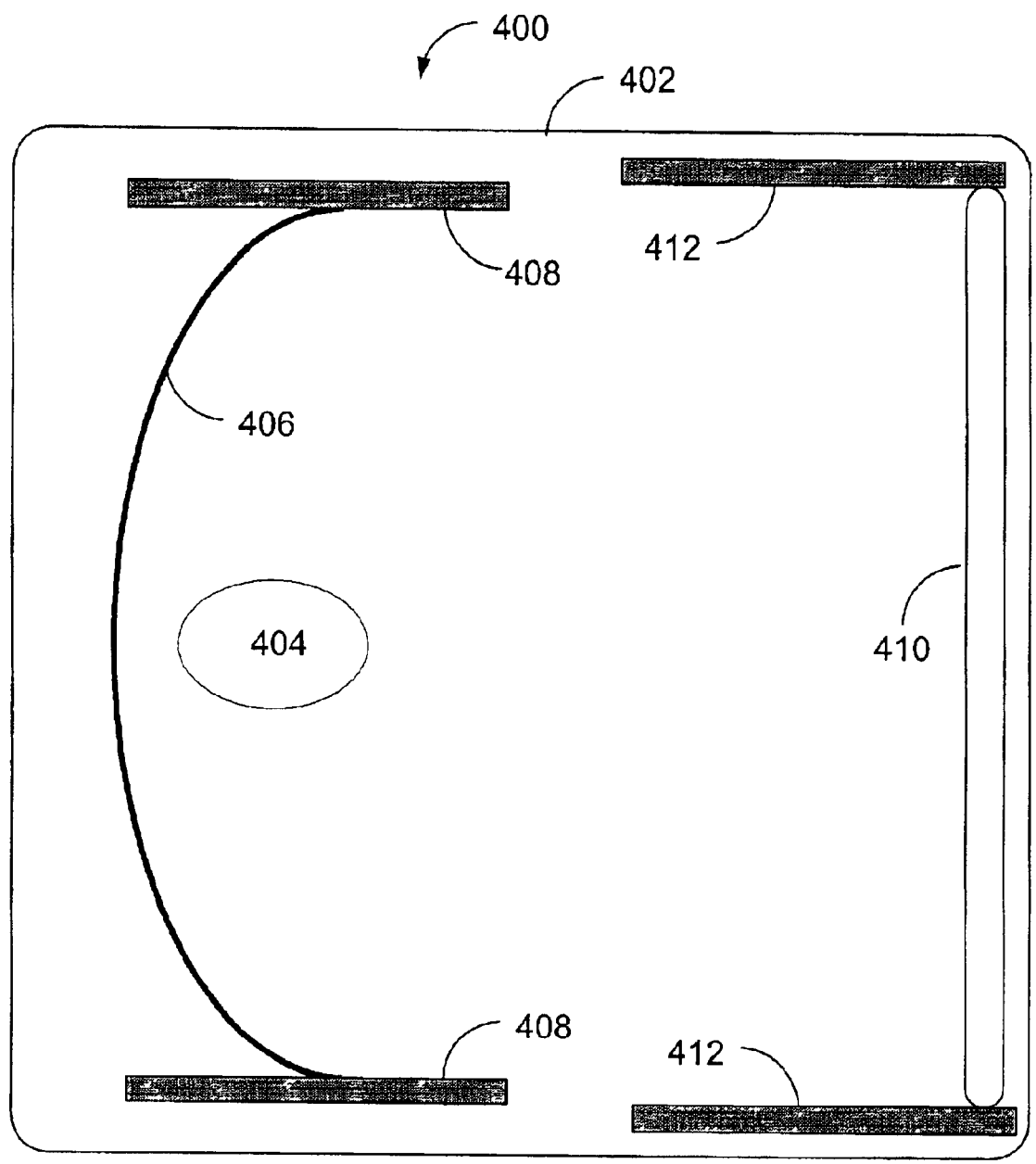
FIG. 4 is a cross-section view of an example embodiment of a direction controllable flash with solid angle control according to the present invention.

FIG. 4 is a cross-section view of an example embodiment of a direction controllable flash with solid angle control according to the present invention. In the example embodiment of a direction and collimation controllable flash 400 shown in FIG. 4 the flash 400 includes a flash body 402, a lens 410, a means for moving the lens 412, a strobe tube 404, a reflector 406, and a means for moving the reflector 408. In an example embodiment of the present invention, the lens 410 may be a fresnel lens, and the means for moving the lens 412 may be a gear and track allowing the lens to move toward and away from the strobe tube 404. In this example embodiment of the present invention, as the fresnel lens 410 moves away from the strobe tube 404 the light from the flash becomes increasingly collimated, and as the fresnel lens 410 moves towards the strobe tube 404 the light from the flash becomes decreasingly collimated. Likewise, in an example embodiment of the present invention, the means for moving the reflector 406 may be a gear configured to rotate the reflector 406 on one or more axis of rotation. This allows the reflector 406 to vary the direction of the flash. In other embodiments of the present invention, the reflector 406 may be stationary and the lens 410 may move or rotate to control the direction of the flash 400 in addition to the collimation of the flash 400.

Figure 5:
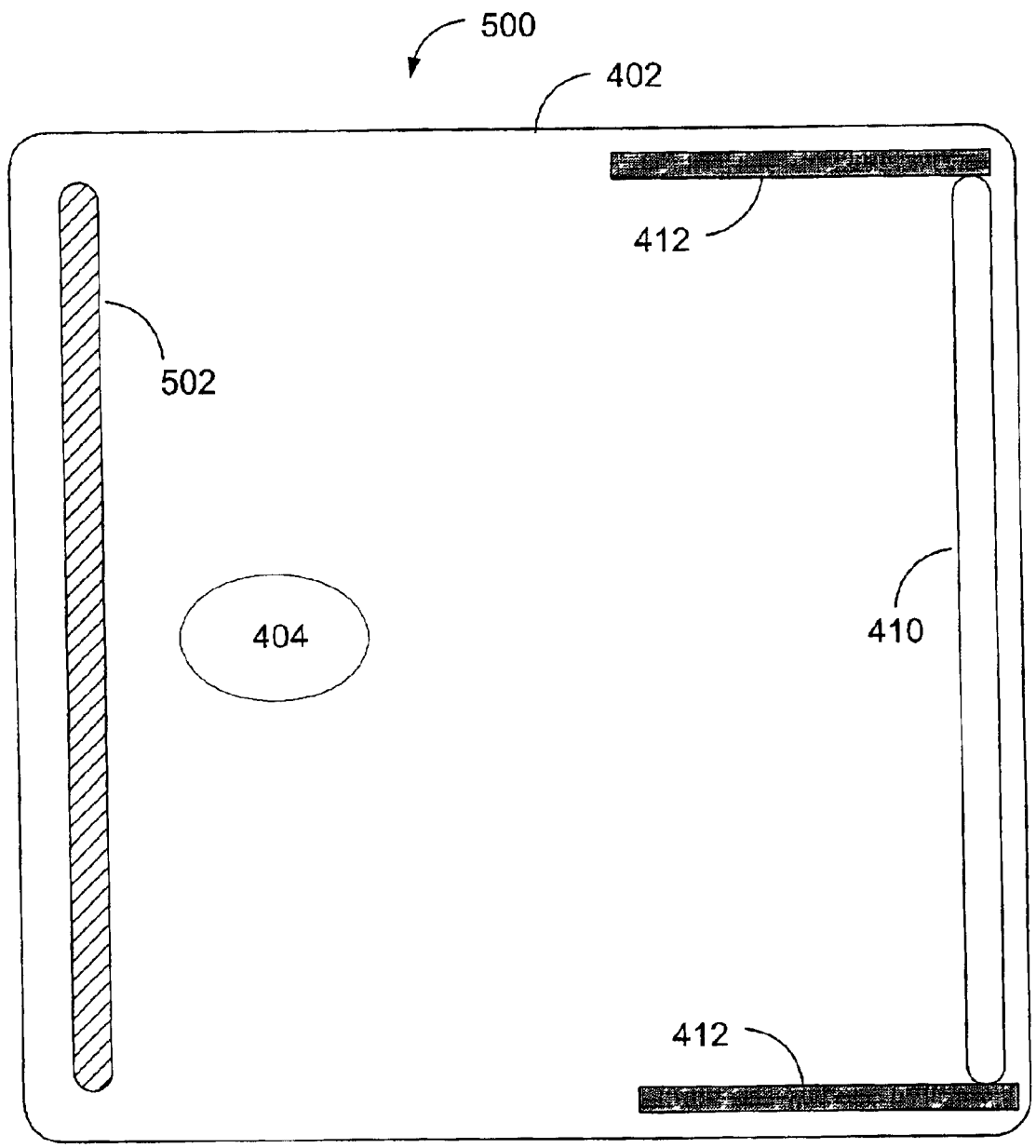
FIG. 5 is a cross-section view of an example embodiment of a direction controllable flash with solid angle control according to the present invention.

In other embodiments of the present invention, the strobe tube 404 may be replaced by other equivalent means for generating a flash of light, such as a flash bulb. Also, in other embodiments of the present invention, the reflector 408 may be replaced by other equivalent means for reflecting such as an array of micro-mirrors as shown in FIG. 5. Further, in other embodiments of the present invention, the lens 410 may be replaced with other means for collimating light such as a plurality of baffles and other means for varying the collimation of the light may be used, such as a means of moving the baffles.

FIG. 5 is a cross-section view of an example embodiment of a direction controllable flash with solid angle control according to the present invention. The example embodiment of the present invention shown in FIG. 5 is similar to the embodiment shown in FIG. 4 with the exception that the reflector 406 has been replaced with an array of micro-mirrors 502. In the example embodiment of a direction and collimation controllable flash 500 shown in FIG. 5 the flash 500 includes a flash body 402, a lens 410, a means for moving the lens 412, a strobe tube 404, and an array of micro-mirrors 502. In an example embodiment of the present invention, the lens 410 may be a fresnel lens, and the means for moving the lens 412 may be a gear and track allowing the lens to move toward and away from the strobe tube 404. In this example embodiment of the present invention, as the fresnel lens 410 moves away from the strobe tube 404 the light from the flash becomes increasingly collimated, and as the fresnel lens 410 moves towards the strobe tube 404 the light from the flash becomes decreasingly collimated. The array of micro-mirrors 502 may be controlled by the user operating the camera to direct the flash in one or more directions. For example, a portion of the array of micro-mirrors 502 may reflect the light in one direction while another portion of the array of micro-mirrors 502 reflects the light in a different direction. This allows the user to select more than one area of the image to highlight with the flash.

In other embodiments of the present invention, the mirror may be used to control both direction and collimation of the flash. Using a mirror, and including means for modifying the distance of the mirror from the strobe tube, including means for shifting the mirror along at least one other axis, collimation and direction may be controlled by a single mirror without the use of a lens.

In other embodiments of the present invention, the lens may be used to control both direction and collimation of the flash. Using a lens, and including means for modifying the distance of the lens from the strobe tube, including means for shifting the lens along at least one other axis, collimation and direction may be controlled by a single lens without the use of a moveable reflector.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A camera flash comprising:
   a flash body;
   a strobe tube mechanically coupled with said flash body;
   a lens mechanically coupled with said flash body allowing movement along at least one axis, configured to vary collimation of light from said strobe tube; and
   a reflector comprising an array of individually moveable micro-mirrors mechanically coupled with said flash body, configured to rotate about at least one axis in order to vary a direction of reflected light from said strobe tube through said lens.

2. The camera flash recited in claim 1, wherein said lens is a fresnel lens.

3. The camera flash recited in claim 1, wherein said reflector is configured to move along at least one axis.

4. The camera flash recited in claim 1, wherein said reflector is configured to rotate about at least one axis.

5. The camera flash recited in claim 1, wherein said micro-mirrors are configured to reflect light from said strobe tube in at least two different directions.

6. The camera flash recited in claim 1, wherein said lens and said reflector move in response to signals from a camera.

7. The camera flash recited in claim 6, wherein said signals are generated in response to user inputs to said camera.

8. The camera flash recited in claim 7, wherein said user inputs include inputs responsive to movement of an eye of said user.

9. A camera flash comprising:
   a flash body;
   a strobe tube mechanically coupled with said flash body; and
   a reflector comprising an array of individually moveable micro-mirrors mechanically coupled with said flash body allowing movement along a first axis, configured to rotate about at least one axis in order to vary collimation of light from said strobe tube by movement along said first axis;
   wherein said reflector is further mechanically coupled with said flash body allowing movement along a second axis, and is further configured to vary a direction of reflected light from said strobe tube by movement along said second axis.

10. The camera flash recited in claim 9, wherein said reflector moves in response to signals from a camera.

11. The camera flash recited in claim 10, wherein said signals are generated in response to user inputs to said camera.

12. The camera flash recited in claim 11, wherein said user inputs include inputs responsive to movement of an eye of said user.

13. A camera flash comprising:

a flash body;

a strobe tube mechanically coupled with said flash body; and a reflector comprising an array of individually moveable micro-mirrors mechanically coupled with said flash body allowing movement along a first axis, configured to rotate about at least one axis in order to vary collimation of light from said strobe tube by movement along said first axis;

wherein said reflector is further mechanically coupled with said flash body allowing rotation about a second axis, and is further configured to vary a direction of reflected light from said strobe tube by rotation about said second axis.

14. The camera flash recited in claim 13, wherein said reflector moves in response to signals from a camera.

15. The camera flash recited in claim 14, wherein said signals are generated in response to user inputs to said camera.

16. The camera flash recited in claim 15, wherein said user inputs include inputs responsive to movement of an eye of said user.

17. A camera flash comprising:

means for generating a flash of light;

means for reflecting said flash of light, comprising an array of individually moveable micro-mirrors;

means for collimating said flash of light;

means for varying collimation of said flash of light, comprising the array of moveable micro-mirrors configured to rotate about at least one axis; and means for varying a direction of said flash of light.

18. The camera flash recited in claim 17, wherein said means for generating a flash of light is a strobe tube.

19. The camera flash recited in claim 17, wherein said means for generating a flash of light is a flash bulb.

20. The camera flash recited in claim 17, wherein said means for collimating said flash of light is a lens.

21. The camera flash recited in claim 20, wherein said lens is a fresnel lens.

22. The camera flash recited in claim 17, wherein said means for varying collimation comprises a means for moving said moans for collimation along at least one axis.

23. The camera flash recited in claim 17, wherein said means for varying a direction comprises a means for moving said means for reflecting along at least one axis.

24. The camera flash recited in claim 17, wherein said means for varying a direction comprises a means for rotating said means for reflecting about at least one axis.

25. The camera flash recited in claim 17, wherein said means for varying collimation and said means for varying direction move in response to signals from a camera.

26. The camera flash recited in claim 25, wherein said signals are generated in response to user inputs to said camera.

27. The camera flash recited in claim 26, wherein said user inputs include inputs responsive to movement of an eye of said user.

28. A camera comprising:

a flash body;

a strobe tube mechanically coupled with said flash body, a lens mechanically coupled with said flush body allowing movement along at least one axis, configured to vary collimation of light from said strobe tube; and a reflector comprising an array of individually moveable micro-mirrors mechanically coupled with said flash body, configured to rotate about at least one axis in order to vary a direction of reflected light from said strobe tube through said lens.

29. The camera recited in claim 28, wherein said lens is a fresnel lens.

30. The camera recited in claim 28, wherein said reflector is configured to move along at least one axis.

31. The camera recited in claim 28, wherein said reflector is configured to rotate about at least one axis.

32. The camera recited in claim 28, wherein said micro-mirrors are configured to reflect light from said strobe tube in at least two different directions.

33. The camera recited in claim 28, wherein said lens and said reflector move in response to signals from a camera.

34. The camera recited in claim 33, wherein said signals are generated in response to user inputs to said camera.

35. The camera recited in claim 34, wherein said user inputs include inputs responsive to movement of an eye of said user.

36. A method of illuminating a selected area within a scene, comprising the steps of:

a) determining an area to be illuminated, wherein said area has a size and a location within said scene;

b) generating a flash of light to illuminate said selected area;

c) collimating said light to substantially correspond to said area size; and d) directing said collimated light to said area location using an array of individually moveable micro-mirrors, configured to rotate about at least one axis.

37. The method of illuminating a selected area within a scene recited in claim 36, wherein said step of collimating said light comprises moving a lens.

38. The method of illuminating a selected area within a scene recited in claim 36, wherein said step of collimating said light comprises moving a reflector.

39. The method of illuminating a selected area within a scene recited in claim 36, wherein said step of determining an area to be illuminated includes receiving inputs from a user.

* * * * *